Nov. 5, 1963
C. F. ENGEL
3,109,670
AIR DUCT INSTALLATIONS
Filed Oct. 17, 1960
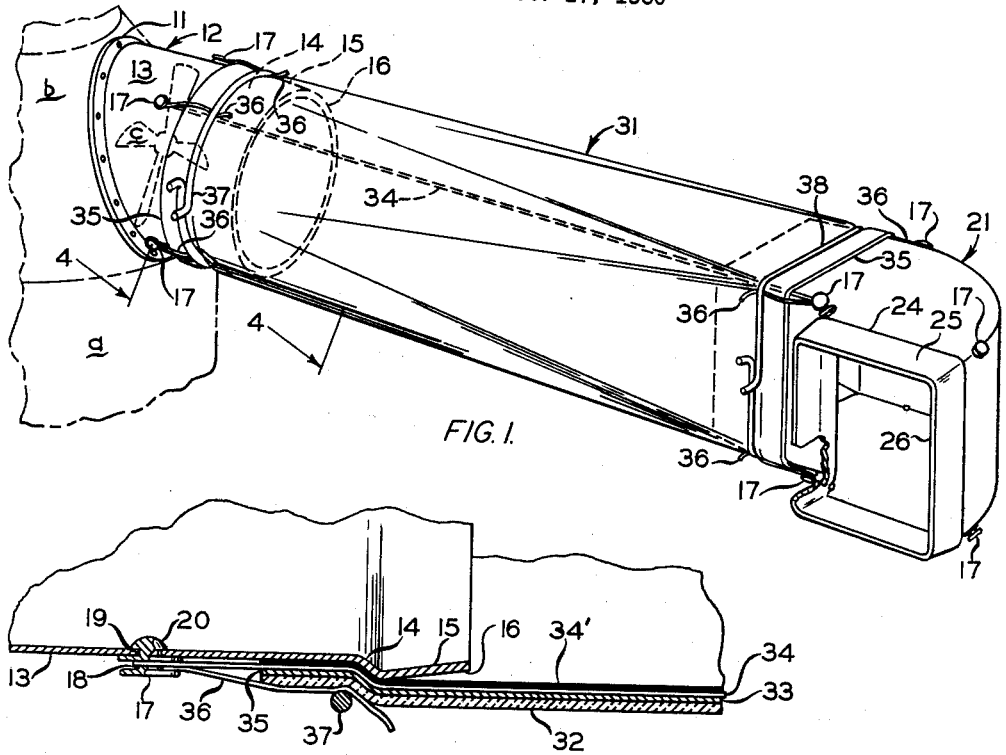
FIG. 1.
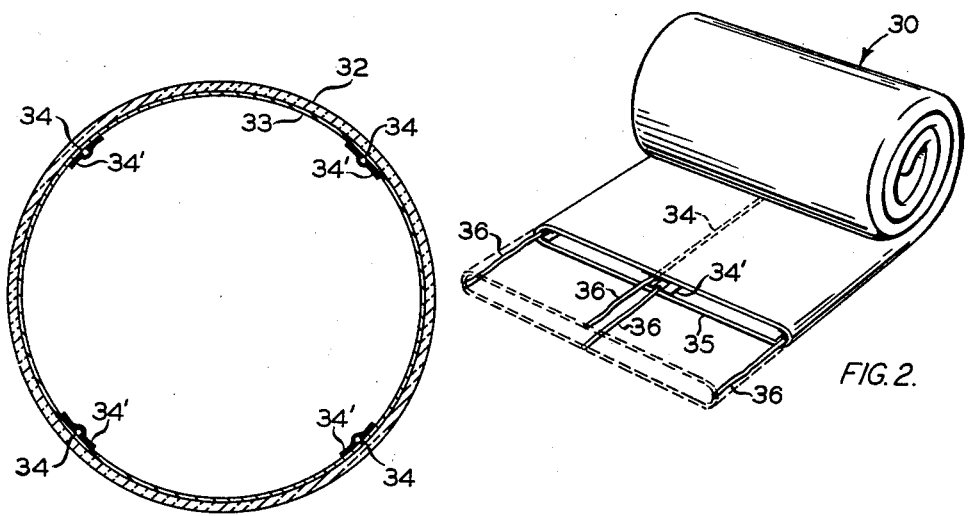
FIG. 4.
FIG. 3.
FIG. 2.
INVENTOR.
CHARLES F. ENGEL
BY
HIS ATTORNEY.

United States Patent Office 3,109,670
Patented Nov. 5, 1963

3,109,670
AIR DUCT INSTALLATIONS
Charles F. Engel, R.R. 2, Columbia, Ill.
Filed Oct. 17, 1960, Ser. No. 63,056
1 Claim. (Cl. 285—114)

The present invention relates to ducts for conducting air, as used in heating and air-conditioning systems.

The purposes of the present invention include: utilizing for such ducts, metal foil or similar flexible lightweight material, supplied in rolls from which necessary lengths may be cut to fit and erected at the job site, and to include an insulating layer, if desired.

Another purpose is to provide for the ready erection of ducts of any desired length, and for connecting them to fittings of a variety of convenient cross-sectional shapes; and to establish the desired cross-section of the duct without the application of any inflating pressure.

Still another purpose is to utilize the pressure of the air so to be distributed to maintain the cross-sectional shape of the duct tubes.

These, and other advantages which will be apparent from the specification, are achieved in the present invention by providing a foldable tube body, formed of flexible air-tight material such as aluminum foil, with longitudinal tension members extending the full length of the tube, and with fittings, each of which includes means to extend the tube end to a desired cross-sectional configuration and means to hold the tension members taut.

In the embodiment hereafter described in detail, such a duct installation is shown in a system for distributing heated or cooled air, the tubing including within its wall a plurality of longitudinal wires, at spaced intervals, which extend the full length of the tube and beyond its ends; the ends being secured over sleeve portions of fittings which, inwardly beyond the sleeve portions, have wire-mounting means located at intervals corresponding to the spacing of the wires within the tubing. At the inner end of each fitting sleeve portion is an outward-projecting peripheral ridge by which the tubing is fully extended; and an external clamp adjacent thereto holds the ends of the longitudinal wires, so mounted to the wire-mounting means, doubled back and clamped against the outer tube surface.

In the accompanying drawing:

FIGURE 1 is a perspective view of a duct installation embodying the present invention, mounted at its left end by a circular fitting to the chamber for heated air at the top of a furnace, and having at its right end a curved rectangular fitting.

FIGURE 2 is a perspective view of a roll of the tubing material utilized in the duct installation of FIGURE 1. The dashed lines show the edge of the tubing before being trimmed back to leave projecting wire ends.

FIGURE 3 is an enlarged cross-sectional view taken at any typical section through the tubing in FIGURE 2, when expanded to circular configuration, as near the left end of FIGURE 1.

FIGURE 4 is an enlarged, detail sectional view taken along line 4—4 of FIGURE 1.

Referring now to the drawing by detail part numbers, there is shown a hot-air furnace generally designated $a$ including at its top a chamber for heated air $b$. Mounted by a flange 11 to the outer wall of the chamber $b$ and in position to receive the flow of air from a fan $c$ therein, is an outlet fitting generally designated 12, extending from the flange 11. It includes a generally cylindrical fitting body 13 extending outward to an annular peripheral ridge 14 of slightly enlarged diameter, and thence tapering inwardly to form a mounting sleeve portion 15 which terminates in a circular fitting edge 16 of somewhat lesser diameter.

Spaced around the periphery of the fitting body 13 at 90° angular intervals, are externally-projecting wire-mounting buttons 17, each of which has a shank 18 by which it is spaced a sufficient distance from the outer surface of the fitting body 13 to provide for wrapping a wire therearound. The wire-mounting buttons 17 may be secured through holes 19 drilled in the fitting body 13 by rivet-like heads 20 formed on the inner ends of the shanks 18.

At the right end of FIGURE 1 is shown a 90° bend rectangular duct fitting generally designated 21. As shown, it has a squared cross-section, but save for this fact, both of its end openings are similar to the outlet fitting 12 hereinabove described. Specifically it has, inwardly adjacent each end, a peripheral ridge 24, tapering from which is a sleeve portion 25 which terminates in a square fitting edge 26 whose peripheral length is less than that of the peripheral ridge 24. Inward of the peripheral ridge 24 and mounted on each of the corners of the duct fitting 21 are wire-mounting buttons 17, such as heretofore described.

Comparing the circular outlet fitting 12 with the 90° bend rectangular fitting 21, the circumferences of their sleeve portions 15, 25 and peripheral ridges 14, 24, correspond, and their wire-mounting buttons 17 are in substantial angular registration.

The duct material is manufactured in the form of long lengths of aluminum foil tubing, flattened and rolled as shown by the roll generally designated 30 of FIGURE 2. From it there may be cut duct bodies of any desired length, such as the duct body 31 of FIGURE 1. Referring to FIGURE 3, which shows a cross-section taken after expanding the material of FIGURE 2, as by inflating it, the roll 30 comprises an outer insulating or blanketing layer 32 made of fibrous insulating material, adhesively laminated onto an inner aluminum foil lamination 33, with longitudinal reinforcing wires 34, held to the foil by longitudinal adhesive tapes 34', located parallel and at equally spaced intervals and extending the full length of the roll 30. The wires may either be solid or braided, and may be formed of any material sufficiently pliable to secure to the mounting buttons 17 and yet strong enough to withstand the tension incident to erecting the material and holding it taut as hereinafter described. Alternately, other parallel tension members may be used, to erect and hold taut by equivalent means, a foldable tube substantially impervious to air.

Prior to erecting the tubing, a duct body 31 is cut from the roll 30, to a length sufficiently greater than the space between the outlet fitting 12 and the rectangular fitting 21 to provide for covering their peripheral ridges 14 and 24 as shown, after being trimmed back to provide wire ends 36 six or eight inches long. Such projecting wire ends are referred to as the supporting wire ends 36.

In order to erect the duct body 31, between the theretofore erected rectangular duct fitting 21 and the outlet fitting 12, the duct is expanded at its ends to the cross-sectional configuration of the respective peripheral ridges 14 and 24 by drawing the duct edges 35 over the sleeve portions 15 and 25 of the respective fittings 12 and 21. The supporting wire ends 36 at one fitting—say the outlet fitting 12—are then mounted to the projecting buttons 17 by winding around their shanks 18 and doubling back. A spring wire ring clamp 37 is then placed over the duct body 31 inwardly of its edge 35 and over each of the doubled-back supporting wire ends 36. The ring clamp 37 is adjusted in place against the annular peripheral ridge 14 so as to clamp the duct immediately inward of its edge against the peripheral ridge 14 and also to safety the supporting wire ends 36.

The other end of the duct body 31 is similarly mounted over the tapering squared sleeve 25 and the squared peripheral ridge 24, the supporting wire ends 36 being drawn taut around the shanks 18 of the mounting buttons 17 on the duct fitting 21.

A substantially rectangular clamp 38, which may be formed of spring wire similar to the split ring wire clamp 37, is provided over the duct body 31 just inward of the peripheral ridge 24. It holds the margin of the duct body 31 clamped securely thereagainst and safeties the supporting wire ends 36 as hereinbefore described.

As the wire ends 36 are drawn taut, the reinforcing wires 34 are given a new function—to support the duct open and straight throughout its entire length. They provide a gradual transition between the rounded cross-section of the outlet fitting 12 and the squared cross-section of the rectangular fitting 21. If the same configuration of fitting was used for both ends, the shape of the duct 31 would be nearly the same throughout its length.

The tautness of the reinforcing wires 34 thus secures good duct shape when using a roll of metal foil tubing whose flexibility is such that it would otherwise be unsuitable for duct purposes. The gage required will vary with such obvious factors as the diameter of the tubing. It is to be understood, however, that such tubes are to be utilized only on the pressure side of air heating and cooling installations, not on the suction side thereof.

Flexible material utilized for the duct permits lengths of many yards of the material to be prepared into a single roll, which may be readily carried to a job site and there cut to fit. Replacement sections, when required, are readily cut on the job. There is no need to take measurements, go to the shop to fabricate duct sections, and then return to the job to install them. Consequently, a great saving results in transportation, handling and labor costs; and the cost of the material itself is substantially lessened, yet with an ease of installation not known heretofore.

It will be apparent that other materials may be substituted; also, other means of securing the duct bodies to the supporting wires may be provided, and obvious variations made in the detail fitting design. Accordingly, this invention is not to be construed narrowly but instead as fully coextensive with the claim hereof.

I claim:

Duct installations for conducting air under pressure greater than atmospheric, comprising a duct including a metal foil foldable tube having a plurality of longitudinal spaced parallel reinforcing wires embedded therein, each extending the entire length of the tube and projecting longitudinally therebeyond at each end, and tube fittings each including a sleeve portion having an end whose periphery is smaller than the periphery of the tube, the sleeve portion tapering enlargingly from its end to a cross-section whose external periphery is substantially equal to the periphery of the tube, each tube fitting further having a reduced portion adjacent to said section, each tube fitting further including external wire-mounting projections spaced around the periphery of the fitting inward from the sleeve portion end and at intervals corresponding with the spacing of the parallel wires so embedded within the tube.

References Cited in the file of this patent
UNITED STATES PATENTS

| | | |
|---|---|---|
| 471,266 | Buscher | Mar. 22, 1892 |
| 529,216 | Tatham | Nov. 13, 1894 |
| 631,376 | McCreery | Aug. 22, 1899 |
| 1,106,542 | Buehner | Aug. 11, 1914 |
| 1,303,098 | Merz | May 6, 1919 |
| 1,902,763 | Czapiewski | Mar. 21, 1923 |
| 2,544,120 | Wolfe | Mar. 6, 1951 |
| 2,722,237 | Rosel | Nov. 1, 1955 |
| 2,726,682 | Conroy | Dec. 13, 1955 |
| 2,741,496 | Melson | Apr. 10, 1956 |
| 2,821,896 | Kice | Feb. 4, 1958 |
| 2,824,575 | Rosen | Feb. 25, 1958 |
| 2,861,598 | Carder | Nov. 25, 1958 |